US008864081B2

(12) United States Patent
Constans et al.

(10) Patent No.: US 8,864,081 B2
(45) Date of Patent: Oct. 21, 2014

(54) METHOD AND DEVICE FOR AN OPTIMAL MANAGEMENT OF THE SLATS, THE FLAPS AND THE LANDING GEAR OF AN AIRCRAFT

(75) Inventors: Florian Constans, Pibrac (FR); Mickaël Lefebvre, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 189 days.

(21) Appl. No.: 13/557,381

(22) Filed: Jul. 25, 2012

(65) Prior Publication Data

US 2013/0026299 A1  Jan. 31, 2013

(30) Foreign Application Priority Data

Jul. 29, 2011 (FR) .................................... 11 56959

(51) Int. Cl.
  *G05D 1/00* (2006.01)
  *G05D 1/12* (2006.01)
  *G05D 1/06* (2006.01)
(52) U.S. Cl.
  CPC .................................. *G05D 1/0676* (2013.01)
  USPC ........................................................ 244/183
(58) Field of Classification Search
  CPC . G05D 1/0676; G05D 1/0653; G05D 1/0607; G05D 1/042; G05D 1/101; G05D 1/0088
  USPC ......... 244/183, 184, 185, 186, 187, 188, 202, 244/81
  See application file for complete search history.

(56) References Cited

U.S. PATENT DOCUMENTS

| 2006/0200279 | A1* | 9/2006 | Ainsworth et al. ............. 701/16 |
| 2008/0140272 | A1  | 6/2008 | Zadrozynski et al. |
| 2009/0195413 | A1* | 8/2009 | Constans ...................... 340/971 |
| 2010/0036551 | A1* | 2/2010 | Lacaze et al. ................... 701/18 |
| 2010/0217461 | A1* | 8/2010 | Ledesma et al. ................ 701/18 |
| 2012/0116611 | A1* | 5/2012 | Westphal et al. ........... 244/76 R |

FOREIGN PATENT DOCUMENTS

| EP | 2282247 | 2/2011 |
| FR | 2908220 | 5/2008 |

OTHER PUBLICATIONS

French Patent Office, Preliminary Search Report for FR 1156959, Feb. 22, 2012 (2 pgs.).

* cited by examiner

Primary Examiner — Timothy D Collins
Assistant Examiner — Richard R Green
(74) Attorney, Agent, or Firm — Wood, Herron & Evans, LLP

(57) ABSTRACT

A method is described for optimized energy management of an aircraft upon a flight along a trajectory. The method allows the aircraft to join a given point of the trajectory in a given energy state, with a given position of the slats and flaps, and with a given position of the landing gear. The method includes determining current parameter values of the aircraft. The method also includes determining optimized command orders based on the current parameter values by performing a sequence of operations in an iterative way. The method further includes applying the optimized command orders to an automatic slats and flaps command device and an automatic landing gear command device for automatic control of the slats and flaps and the landing gear, respectively.

15 Claims, 2 Drawing Sheets

METHOD AND DEVICE FOR AN OPTIMAL MANAGEMENT OF THE SLATS, THE FLAPS AND THE LANDING GEAR OF AN AIRCRAFT

TECHNICAL FIELD

The present invention relates to a method and a device for an optimized energy management of an aircraft, in particular an airplane and specifically a transport airplane, upon a flight along a predetermined trajectory, so as to join a given point of said trajectory in a given energy state, with a given position of the slats and flaps, as well as of the landing gear.

More precisely, the invention aims at optimizing the monitoring of the aerodynamic configuration of the airplane, namely the use of the slats and flaps (defining the aerodynamic configuration) and of the landing gear of an airplane so as to provide a stabilized flight in one point of the trajectory with a speed, an aerodynamic configuration and a position of the landing gear being given.

Although not exclusively, the present invention applies more particularly to an approach phase in view of a landing on a runway in an airport or on any other known way.

The present invention thus relates to an airplane guiding toward an objective (given point) located in the space. In addition to the meeting point to be satisfied, other constraints are imposed and must be satisfied, such as a setpoint speed, an aerodynamic configuration, a position of the landing gear and/or operational constraints.

In the scope of the invention:
the energy state of an airplane represents the total energy that can be defined from the airplane speed and the height thereof relative to the ground; and
the term space means the air space in which an airplane can fly and the points of which are usually defined by three coordinates (longitude, latitude, altitude).

BACKGROUND

It is known that the pilot of an airplane has available different correction or monitoring means to meet the meeting point and this, according to different associated energy levels. There are can be conventional means such as engines and airbrakes, but also other means linked to the dynamical configuration of the airplane, such as the slats and flaps and the landing gear which also impact on the airplane performances and, consequently, on its capacities to modify the energy thereof. Still three other so-called operational means can be mentioned, namely the modification of the vertical plan, based more on the notion of energy distribution between kinetic energy and potential energy, the modification of the lateral plan, allowing the ground trace to be adjusted and the airplane energy situation to thus be adapted with the setpoint and finally the modification of the setpoint speed servo-controlled by the self-thrust.

The present invention applies more particularly to the position control of the slats and flaps (defining the aerodynamic configuration of the airplane) and to the position control of the landing gear.

For the approach cases, whatever the piloting mode being considered (manual, managed, selected), the command of the different aerodynamic configurations and of the landing gear always stays manual and under the responsibility of the pilot. In particular, the pilot controls the extension of the slats and flaps manually with the help of a lever provided for this purpose. The extension of the slats and flaps having a direct impact on the airplane performance, the pilot must plan such extension as a function of the flied trajectory and of the targeted setpoint speed.

On the present airplanes, the slat and flap configuration changes are decided by comparison between the airplane speed and characteristic speeds expressed in calibrated speed CAS. Such operational speeds are the following:
  a minimum operational speed in a smooth configuration (so-called "green dot speed"). Switching into configuration 1 generally occurs at such speed. This speed specifically offers the best fineness in a smooth configuration. It depends on the altitude and the mass of the airplane;
  a recommended speed (so-called "S-speed") to control the configuration 2. This speed depends on the minimum monitoring speed VMCL (minimum monitoring speed), on the speed VS1g (minimum speed to maintain a uniform rectilinear flight) in a configuration 1 and on the speed VFE (maximum speed under which the configuration can be activated) in a configuration 2;
  a recommended speed (so-called "F2-speed") so as to control the configuration 3. Such a speed depends on the minimum monitoring speed VMCL, on the speed VS1g in a configuration 2 and on the speed VFE in a so-called "full" configuration; and
  a recommended speed (so-called "F3-speed") to control the so-called "full" configuration. Such speed depends on the monitoring minimum speed VMCL, on the speed VS1g in a configuration 3 and on the speed VFE in a so-called "full" configuration.

Conventionally, according to the invention, the extension of the landing gear is controlled as soon as the configuration 2 is extended. Nevertheless, generally speaking, the landing gear can be used under the so-called DLO speed (maximum speed under which the landing gear can be extended).

Consequently, in spite of an increasing automation on the airplanes, some actuators, amongst others the actuators of the slats, the flaps and the landing gear, only stay usable in the manual way.

Thus, in order to help the pilot to take a decision or to inform the pilot about the current energy state of the airplane, it is known from the document U.S. Patent Publication No. 2008/0140272 a solution allowing the over-energy situations to be anticipated. The object of such a solution is to display two energy prediction circles on an interface ND ("Navigation Display") of the cockpit so as to inform the pilot about its energy state predicted at the level of the runway threshold. Both calculated predictions consider the hypothesis of a standard descent (standard trajectory with a standard deceleration step, extension of the aerodynamic configurations and of the landing gear according to the standard procedure) and a limit descent (anticipated extension of the aerodynamic configurations, anticipated train extension, maximum extended airbrakes). Thanks to the representation of such circles, the pilot can anticipate the under- or over-energy state by using respectively the engines or the airbrakes and can thus bring back the airplane toward an acceptable energy state. Such solution presents the interest to inform the pilot about its energy state, however the correction to be applied stays at the pilot's charge. Moreover, the energy circles are based on two trajectory types (extreme trajectories) and do not provide any precise indication for other types of intermediate trajectory.

Consequently various problems are to be solved:
  to inform the pilot about its energy state throughout its trajectory up to a final objective. The solution proposed by the document US-2008/0140272 is of a great utility upon the descent phase until the deceleration point, but it only presupposes two package ways of piloting the airplane and does not provide itself the implementation of the airplane piloting;

to help the pilot in his decision taking. Upon non nominal situations (in case of wind, over-energy, under-energy), the pilot must use his know-how to adapt the airplane piloting to the changing external surroundings and to the current performances of the airplane. The pilot must call on his own experience to estimate the effect of the use of different actuators on the coming energy state. Such estimate stays however imprecise and not optimal;

to reduce the working charge of the pilot. In fact, as indicated above, several actuators must be manually adjusted.

SUMMARY OF THE INVENTION

The present invention aims at remedying such drawbacks. It relates to an optimized energy management method for a airplane, in particular a transport airplane, upon a flight along a trajectory, allowing the use of slats and flaps (defining the aerodynamic configuration of the airplane) and of the landing gear to be optimized so as to join a given point of said trajectory in a given energy state, with a given position of the slats and flaps as well of the landing gear, especially upon an approach phase for a landing.

With the end in view, according to the invention, said method is remarkable in that, upon the flight of the airplane along said trajectory until said given point, automatically and repetitively, the sequence of successive steps is implemented as follow:

a) the current values of parameters of the airplane are determined;

b) the predicted energy state of the airplane at said point is calculated as a function of these current values and predetermined models and iteratively as a function of the predicted energy state, optimized command orders of means for controlling slats and flaps and the landing gear of the airplane are determined, said optimized command orders being such that they allow the airplane to reach said given point in said given energy state; and c) the optimized command orders being thus determined are applied to said command means for slats and flaps and the landing gear.

So, thanks to the invention, thru the above mentioned iterative processing by taking a predicted energy state of the airplane into account at the point to be joined, it is automatically possible to determine optimized command orders (of the means for controlling slats and flaps as well as the landing gear) allowing the airplane to reach said point while presenting said given energy state.

Moreover, since such processing, as detailed below, is iterative, throughout the flight, the commands of the slats and flaps, as well of the landing gear are adapted for the current situation of the airplane.

The aim of the invention is to optimize such commands in cases of moderated under-energy and over-energy. Preferably, upon the implementation of the invention, the engines and the airbrakes of the airplane are not used, thereby implicitly providing an optimal character in terms of noise caused by the airbrakes and the engines, and an optimal character in terms of fuel consumption.

Nevertheless, the present invention also operates in the cases where the engine thrust is at a given level and/or in the case where the airbrakes are in a given position.

Advantageously, at step a), the current values of the following parameters are determined:
a synchronized time;
an air speed of the plane;
a ground distance of the plane with respect to a given point;
an altitude of the airplane;
the position of the slats and flaps;
the position of the landing gear;
the calibrated speed CAS of the airplane; and
possibly an engine thrust level; as well as
the position of the airbrakes.

Furthermore, according to the invention, at step b), a prediction module and an optimization module for the command orders to be applied to said command means are provided. In addition, advantageously, at the step b), the following sequence of operations is made on an iterative way:

b1) an energy profile predicted thru a prediction module is calculated;

b2) for such predicted energy profile, an energy error (corresponding to the difference between the predicted energy and a setpoint energy) is calculated;

b3) if the energy error is not stabilized (in the meaning that it does not converge), the following operations are implemented in an iterative way:
the efficiency of the command orders on the objective to be reached is calculated;
corrections to be applied to the command orders are calculated;
the command orders are updated;
then back to the step b1); and b4) if the energy error is stabilized (in that meaning that it converges) and minimized, said optimized command orders looked at (corresponding to the command orders for which this stabilization and this minimization of the energy errors are obtained) are obtained.

In a preferred embodiment:
said prediction module predicts the energy at said given point by making progressive calculations for a plurality of successive segments along the trajectory up to the given point, each segment corresponding either to a constant aerodynamic configuration phase with or without the landing gear being extended or to a transient phase of aerodynamic configurations or to an extension of the landing gear, parameters predicted at the end of any segment being used as initial parameters for the segment directly following; and
said optimization module calculates corrections to be applied to the command orders so as to be able to cancel the energy error.

Moreover, advantageously, at step b), some of the following constraints are also taken into account:
constraints of maximal speed being representative of each aerodynamic configuration;
constraints of minimal speed being representative of each aerodynamic configuration; and
extension times for the slats and flaps as well as the landing gear.

Furthermore, advantageously:
the above mentioned models comprise at least some of the following elements: a wind model, airplane performance models, an indication of the dynamics for the actuators and an indication of operational constraints; and
at step c), information relative to the command of the slats and flaps and of the landing gear is presented to a pilot of the airplane.

The present invention presents consequently numerous advantages. Between other things, it allows:
- the cohesive control of the energy control means (slats, flaps and gear) to be implemented automatically;
- the pilot to be informed in real time about the energy states of the airplane thru appropriate operational parameters (indication of speed, altitude, . . . ), whatever instantaneous and future. The future state is the state predicted at the given point of the meeting operational state;
- the pilot to be informed in real time about the commands applied to the slats, flaps and gear at the present time or at future times and their effects on the trajectory and the energy balance of the airplane; and
- the piloting charge of the pilot to be globally reduced.

The present invention also relates to an optimized energy management device for an airplane, in particular a transport airplane, upon a flight along a predetermined trajectory, allowing the use of the slats and flaps (defining the aerodynamic configuration of the airplane) and of the landing gear to be optimized so as to join a given point of said trajectory with a given energy state, with a given position of the slats and flaps as well as the landing gear, specifically upon an approach phase in view of a landing.

According to the invention, said device is remarkable in that it comprises:
- means for determining the current values of the parameters of the airplane upon the airplane flight along said trajectory up to the given point;
- means for calculating the predicted energy state of the airplane at said point, as a function of these current values and predetermined models and for determining on an iterative way depending on the predicted energy state, optimized command orders of command means for the slats and flaps and the landing gear of the airplane, said optimized command orders being such that they allow the airplane the given point to be reached in said given energy state; and
- command means for the slats and flaps and the landing gear of the airplane, to which the optimized command orders being so determined are applied.

In a particular embodiment, said device provided for the flight control and the flight operational management comprises in addition:
- display means to present to a pilot of the airplane, on a viewing screen, information relative to the commands; and/or
- interface means allowing the pilot to enter data in said device.

The present invention also relates to an airplane, in particular a transport airplane, which is provided with a device such as the one above mentioned.

BRIEF DESCRIPTION OF THE DRAWINGS

FIGS. of the accompanying drawing will make understood how the invention can be implemented. On these FIGS., identical annotations denote similar elements.

DETAILED DESCRIPTION

Figure 1:
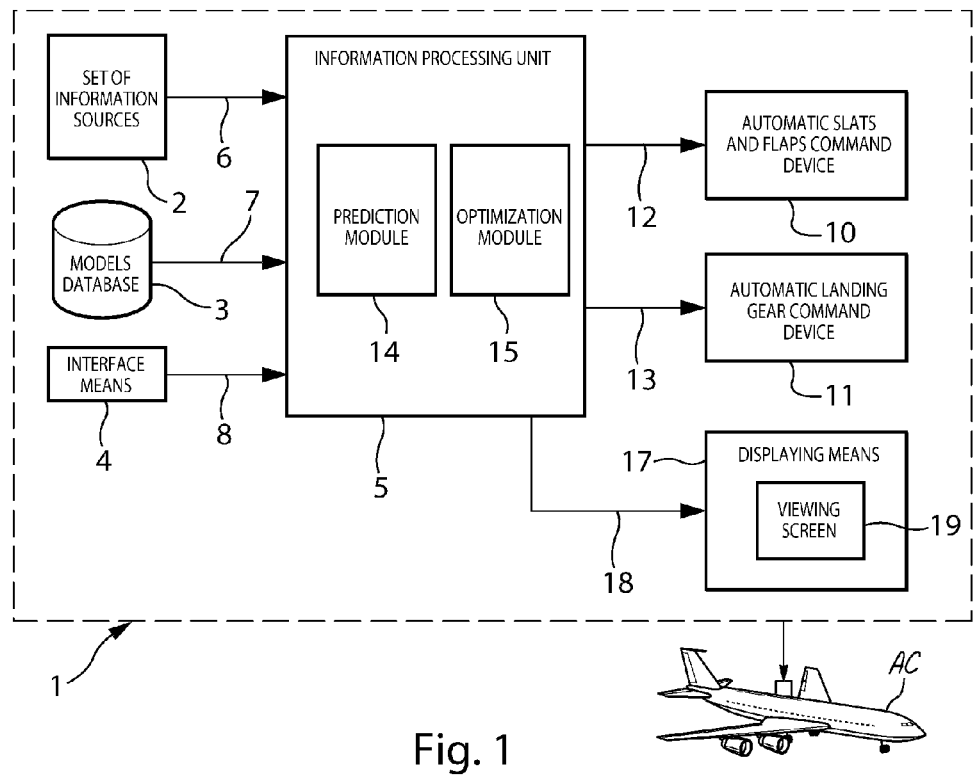
FIG. 1 is the block diagram of a device according to an embodiment of the invention.

The device 1 according to the invention and schematically represented on FIG. 1 is provided to implement an optimized energy management for an airplane (not represented), in particular a transport airplane, upon a flight along a predetermined trajectory so as to join a given point of said trajectory in a given energy state, especially upon an approach phase in view of a landing on a runway of an airport or on any other known way.

More precisely, said device 1 aims at optimizing the use of the slats and flaps (defining the aerodynamic configuration of the airplane) and the use of the landing gear so as to allow the airplane to satisfy the meeting at said point with a setpoint speed, a setpoint aerodynamic configuration and a setpoint position of the landing gear, and this from another point of the trajectory with an initial speed, an initial aerodynamic configuration and a given position of the landing gear.

According the invention, to do so, said device 1 comprises:
- a set 2 of usual information sources being detailed hereinunder, allowing the current values of the flight parameters of the airplane to be determined;
- at least one data base 3 comprising models being also detailed hereinunder;
- interface means 4, in particular a keyboard associated with a screen or any other usual means allowing a pilot to enter data into the device 1;
- an information processing unit 5 which is linked thru links 6 to 8 respectively to said set 2, models database 3, and interface means 4, and which is formed so as:
  - to calculate the predicted energy state of the airplane at the point to be reached as a function especially of these current values and these models; and
  - to determine on an iterative way as a function of the predicted energy state optimized command orders for the slats and flaps and the landing gear (not represented) of the airplane, said optimized command orders being such that they allow the airplane to reach the point to be joined in a given energy state; and
- automatic slats and flaps command device 10 for an automatic command of slats and flaps, as well as automatic landing gear command device 11 for an automatic command of the landing gear of the airplane, to which optimized command orders are applied, being determined by the information processing unit 5, that are respectively transmitted via links 12 and 13.

Usually, the landing gear can take two positions, namely one retracted position and one extended position, and the slats and flaps can take different positions defining the possible aerodynamic configuration of the airplane. These configurations can be defined in a very large number. In the case where the airplane has available a continuous position of the slats and flaps between two limits, this continuous range of positions can be fragmented into a given number of intermediate positions. Thus, the invention is indifferently adapted to airplanes with discrete or continuous aerodynamic configurations.

The unit 5 which can be part of a usual calculator of the airplane comprises:
- a prediction module 14; and
- an optimization module 15.

Starting from a vertical trajectory and a lateral trajectory being planned, the device 1 is thus able in a first time to predict the airplane energy situation with the help of the prediction module 14. In parallel, the optimization module 15 is able to optimize in an iterative way the command sequence of the slats, the flaps and the landing gear so as to modulate the overall energy profile, in particular to re-establish the airplane on a stabilized approach.

In a preferred embodiment:
said prediction module 14 predicts the energy at said given point making progressive calculations for a plurality of successive segments along the trajectory until said given point, each segment corresponding to a constant aerodynamic configuration phase with or without the landing gear being extended or to a transient phase of aerodynamic configurations or at an extension of the landing gear, parameters predicted at the end of any segment being used as initial parameters for the directly following segment; and
said optimization module 15 calculates especially corrections to be applied to the command orders so as to be able to cancel an energy error.

Said device 1 also comprises displaying means 17 which are linked by a link 18 to the unit 5 and which are formed so as to present to a pilot of the airplane, on a viewing screen 19 of the piloting cockpit, information relative to the implementation of the invention and especially information relative to the control of the automatic slats and flaps command device 10 and the automatic landing gear command device 11, such as, for example, the moment where the landing gear is extended or the moment where the aerodynamic configuration is modified.

Furthermore, the data base 3 can comprise at least some of the following elements being used by the unit 5: a wind model, at least one performance model, an indication of the dynamics of the actuators associated with energy monitoring means and an indication of operational constraints.

Consequently, thru the above mentioned iterative processing taking into account a predicted energy state of the airplane at the point to be joined, the device 1 according to the invention is in a position to automatically determine optimized command orders (the automatic slats and flats command device 10 for the slats and flaps, as well as the automatic landing gear command device 11 for the landing gear) allowing the airplane to reach said point while being in said given energy state.

Moreover, as such processing is iterative, the device 1 adapts throughout the flight the commands of the automatic slats and flats command device 10 and the automatic landing gear command device 11 to the current situation of the airplane.

Although not exclusively, the present invention applies more particularly to an approach phase in view of a landing on a runaway of an airport or on any other known way, so as to reach a predetermined point before the final landing. In such preferential case, the objective is to keep a certain trajectory, and then to stabilize the airplane at a certain approach speed and this, at a certain point in the space of said trajectory before the runaway threshold.

In the scope of the present invention, said set 2 of information sources can comprise, for example:
an air data calculator of the ADC ("Air Data Computer") type;
at least one inertial reference system of the IRS ("Inertial Reference System") type; and
a flight management system of the FMS ("Flight Management System") type.

In a particular embodiment, said set 2 provides especially the current values of the following parameters:
the time (being synchronized with the device 1);
the air speed of the airplane;
the ground distance of the airplane with respect to a given point, preferably the threshold to the runway;
the altitude of the airplane;
the position of the slats and flaps (i.e. the aerodynamic configuration);
the positions of the landing gear;
the calibrated speed (CAS) of the airplane; and
possibly the engine thrust level; as well as
the position of the airbrakes.

The information processing unit 5 thus requires inputs to ensure the operation thereof and provides output command orders. More particularly, it uses the following inputs:
the vertical trajectory;
the lateral trajectory;
information contained in the data base 3;
the measurements and the information provided by the set 2; and
guiding objectives.

Such different inputs are detailed hereinafter.

In order to best calculate the different commands for guiding the airplane to a certain point of the trajectory at a given speed, a given aerodynamic configuration and a given position of the landing gear, the device 1 must know the vertical trajectory being flied or able to be flied. This vertical trajectory is defined by passage points at different altitudes depending on the ground distance. According to the invention, a vertical trajectory guiding law is used to keep the airplane on said planned vertical trajectory.

Also, so as to calculate at the best the different commands, the device 1 must also know the lateral trajectory being flied or able to be flied. According to the invention, a lateral trajectory guiding law is also used to keep the airplane on said planned lateral trajectory.

Furthermore, the data base 3 can provide different pieces of information, especially:
a wind model. In order to make the prediction precise, probable wind information is used throughout the trajectory. For this, it is possible to use the same wind model as the flight management system FMS of the airplane;
a dynamics of the actuators. So as to make the prediction precise, dynamics of the different actuators (especially the extension times of the slats and flaps and of the landing gear) are used;
speed constraints. In order to make that the device 1 can take the operational constraints into account, the minimum and maximum operational speeds are provided; and
performance models. So as to be able to realize the prediction, different performance models of the airplane are used, preferably a model for each aerodynamic configuration with or without the landing gear being extended.

Moreover, as the device 1 optimizes the airplane commands so as to meet the meeting point of the airplane at a given point of the trajectory with a certain given speed with given aerodynamic configuration and a given position of the landing gear, these four last pieces of information being necessary so that the unit 5 can perform the different processings therefor. These four pieces of information are informed by the pilot or can be default values.

Furthermore, the device 1 according to the invention can also take at least some of the following constraints into account:
maximum speed constraints VFE (structural load aspect) representative of each aerodynamic configuration;
minimum speed constraints VLS (roll off aspect) representative of each aerodynamic configuration; and
the extension times for the slats and flaps and for the landing gear. These extension times can be modified by taking into account downgraded cases for which the extension times would have to be changed.

Figure 2:
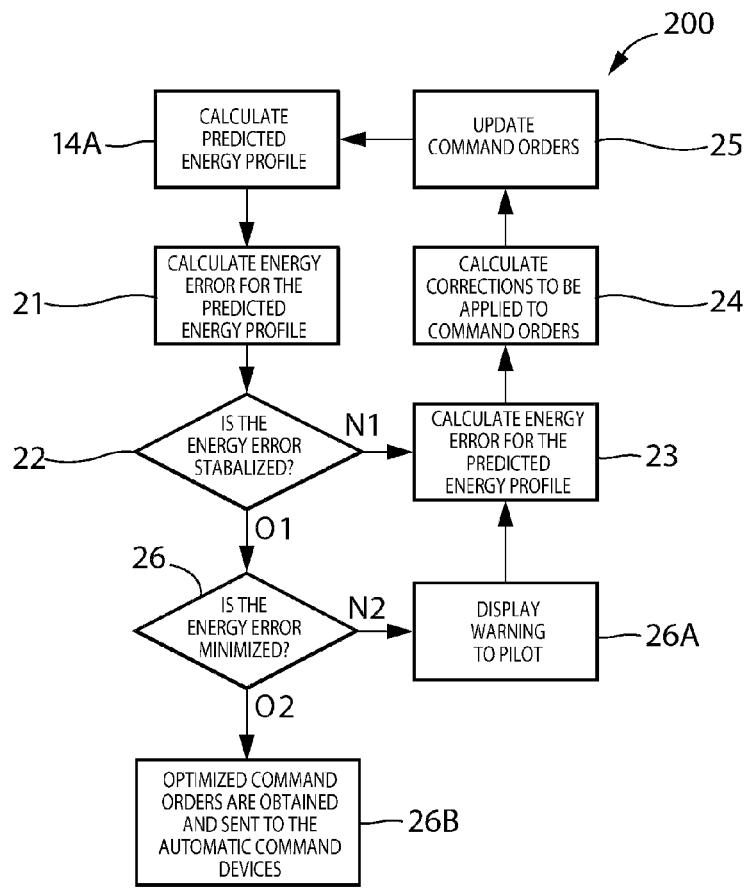
FIG. 2 illustrates a method for determining optimized command orders to an embodiment of the invention.

The unit 5 performs in real time on an iterative way the following sequence of operations, as represented by process 200 in FIG. 2:

b1) at step 14A, a predicted energy profile is calculated by the prediction module 14 on the way being detailed hereinafter, based on information received from set 2, models database 3, and interface means 4;

b2) at step 21, an energy error is calculated for such predicted energy profile (corresponding to the difference between the predicted energy and a setpoint energy). The setpoint energy is usually calculated from setpoints of speed and altitude relative to the flight plan being followed. At step 22, the process 200 then verifies if such energy error is stabilized (converges);

b3) if the energy error is not stabilized (N1) (does not converge):

the process 200 proceeds to step 23, where the efficiency of the command order on the objective to be reached is calculated;

at step 24, corrections to be applied to the command orders are calculated; and at step 25, the command orders are updated and transmitted to the prediction module 14 (return to the step 14A); and if the energy error is stabilized (O1) (converges), the process proceeds to step 26 and verifies if it is minimized.

If the energy error is not minimized (N2), the situation corresponds to a state with too an important over-energy or under-energy and the process 200 proceeds to step 26A, where a corresponding piece of information is transmitted, for example, to the displaying means 17 so as to warn the pilot. In contrast, if the energy error is minimized (O2), the process 200 proceeds to step 26B, where said optimized command orders are obtained, that correspond to the command orders being used to pilot the airplane. This command information is sent via links 12, 13 and 18, for example, to the automatic slats and flaps command device 10 and the automatic landing gear command device 11 for the automatic control of the slats/flaps configuration and of the landing gear, and possibly to the displaying means 17.

The principle of the prediction module 14 is to predict the final energy state of the airplane at a given point of the trajectory, while taking into account the various inputs detailed above, as well as the command sequence of the slats and flaps and of the landing gear being defined by the optimization module 15 (which performs especially said steps 23, 24 and 25 of process 200).

Figure 4:
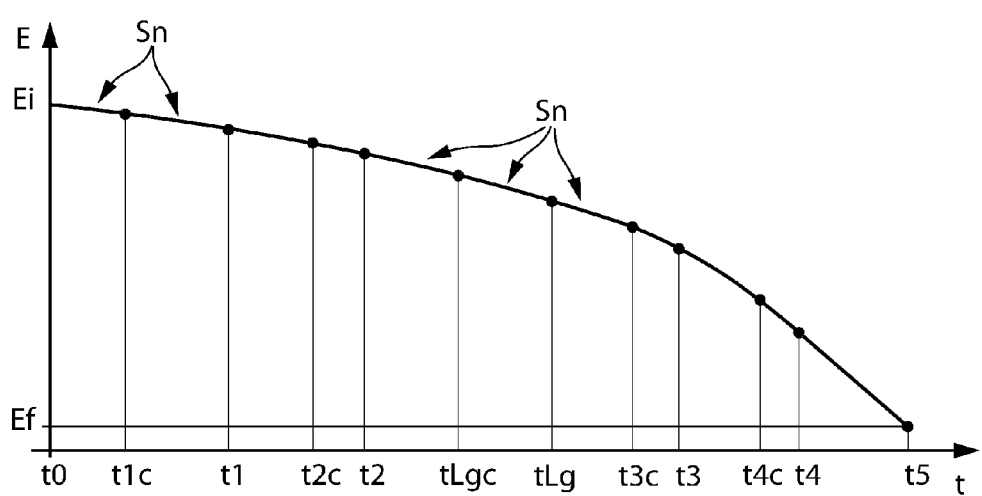
FIG. 4 is a diagram illustrating an energy profile of the airplane upon an approach phase to be able to explain processings implemented by a prediction module for a device according to an embodiment of the invention.

So, for a given command sequence (with an iteration k), represented by variables $\{t_{1_c}^{(k)}, t_{2_c}^{(k)}, t_{1_{gc}}^{(k)}, t_{3_c}^{(k)}, t_{4_c}^{(k)}\}$, the prediction module 14 performs an energy prediction as illustrated on FIG. 4.

On FIG. 4, each segment Sn represents a flied phase, either in a constant configuration with or without the landing gear being extended, or upon a transient of aerodynamic configurations or a landing gear extension.

More precisely, on FIG. 4, a graph is represented showing a variation of the energy E of the airplane as a function of the time t, upon an approach phase, between an initial energy Ei at a time t0 and a final energy Ef at a time t5. On the example of FIG. 4, segments Sn corresponding to the following successive phases are represented:

between t0 and t1c, a flight phase in a smooth configuration;

between t1c and t1, a transient flight phase from a smooth configuration to a configuration 1;

between t1 and t2c, a flight phase in a configuration 1;

between t2c and t2, a transient flight phase from the configuration 1 to a configuration 2;

between t2 and tLgc, a flight phase in a configuration 2;

between tLgc and tLg, a flight phase in a configuration 2 with a (transient) extension phase of the landing gear;

between tLg and t3c, a flight phase in a configuration 2 with the landing gear being extended;

between t3c and t3, a transient flight phase from a configuration 2 with the gear being extended to a configuration 3;

between t3 and t4c, a flight phase in a configuration 3 and the gear being extended;

between t4c and t4, a transient flight phase from a configuration 3 with the gear being extended to a configuration 4;

between t4 and t5, a flight phase in a configuration 4 with the gear being extended.

So, starting from the current state of the airplane (t0), the prediction module 14 starts by calculating a set of parameters at the end of the first segment (segment in a smooth configuration on the example of FIG. 4, but in a current configuration in the real case). The end of the segment is defined by the changing time for the next given aerodynamic configuration by the optimization module 15.

Such set of parameters comprises:

time t;

airspeed TAS $V_a$;

ground distance relative to a given referential x;

altitude h; and calibrated speed CAS $V_C$.

Figure 3:
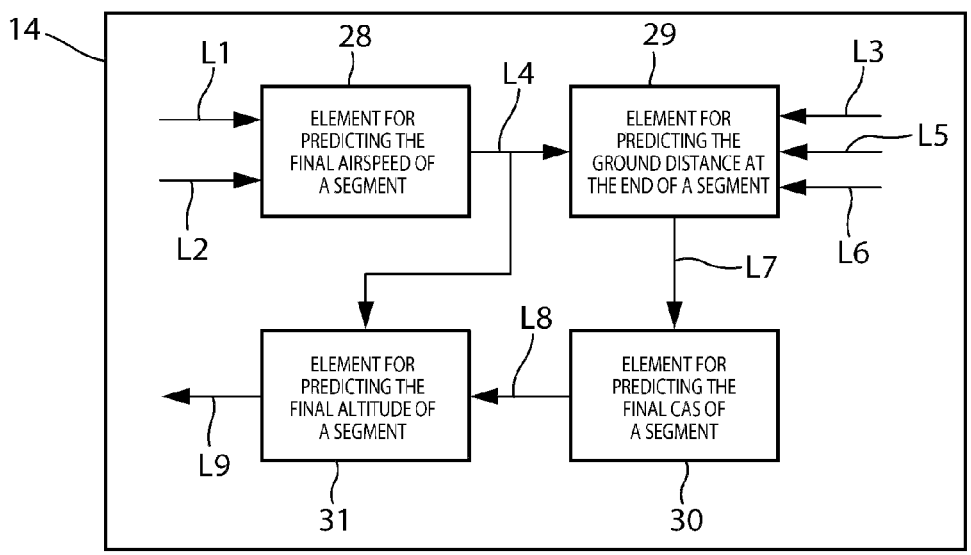
FIG. 3 schematically illustrates a prediction module of a device according to an embodiment of the invention.

Furthermore, FIG. 3 shows elements of the prediction module 14 being used to perform the prediction of the set of the above mentioned parameters for a given segment. To do so, the prediction module 14 comprises:

one element 28 performing a prediction of the final airspeed $V_{af}$ on the segment being considered. The case of a segment with a constant configuration and the case of a segment upon a configuration transient are taken into account. To calculate the final airspeed $V_{af}$ on a segment with a constant configuration, the element 28 implements a usual calculation mode by using the initial speed $V_a$, (received via a link L1) and a time deviation $\Delta t$ (received via a link L2), representing the deviation time between the final and initial times of the segment being considered, thus $\Delta t = t_f - t_i$. The initial adjective applies to any major parameter entering the elements 28, 29, 30 and 31, and the final adjective applies to any major parameter calculated and provided by such elements 28, 29, 30 and 31. For calculating the final airspeed on a segment upon a transient of configuration, the above mentioned calculation of the element 28 is performed twice. Indeed, for a transient segment from a configuration "j" to a configuration "j+1", the final air speed is predicted by the following calculation:

$$V_{af}^{j \rightarrow j+1} = K_1 \cdot V_{af}^j + K_2 \cdot V_{af}^{j+1}$$

with:

K1 and K2 being two weighing gains, such as K1+K2=1;

$V_{af}^j$ being a first prediction calculation of the final air speed by using the above mentioned method in the case of a segment with a constant configuration from the airplane performance in a configuration "j"; and $V_{af}^{j+1}$ being a second calculation in parallel to the preceding one for the prediction of the final airspeed on such same transient segment by using also the above mentioned method in the case of a segment with a constant configuration from the airplane configuration in a configuration "j+1";

one element 29 performing a prediction of the ground distance $x_f$ predicted at the end of the segment being considered, with the help of the initial $V_{ai}$ and final $V_{af}$ air speeds (received via links L3 and L4), the time deviation $\Delta t$ (link L5) and the initial ground distance $x_i$ on the segment being considered (link L6). As an illustration, the initial $V_{ai}$ and final $V_{af}$ air speeds can allow the calculation of an average speed multiplied by the time deviation $\Delta t$ so as to obtain a covered distance. The latter is added to the initial ground distance $x_i$ so as to form the final ground distance $x_f$;

one element 30 performing a final altitude prediction $h_f$ on the segment being considered from the final ground distance $x_f$ (link L7) by taking a usual table into account. Such table represents the planned vertical trajectory to be flied. The planned trajectories are often simple and can be defined by a succession of segments. It is then possible to represent these trajectories by passage points $\{x,h\}$ (or interpolation points) coming from such table. The interpolation of all these points allows the overall appearance of the trajectory to be represented. It is then possible, starting from one point in the ground marker (final predicted ground distance $x_f$), to calculate the final altitude $h_f$ associated with said point in the ground marker. This table can evolve in the case where the vertical trajectory is caused to be modified; and one element 31 performing a prediction of the calibrated speed CAS $V_{cf}$ (transmitted by a link L9) through a usual calculation as a function of the final air speed $V_{af}$ (link L4) and the final altitude $h_f$ (link L18).

Once the set of parameters being predicted at the end of the first segment, these values are used as initial values for the calculation of the second segment (transient segment from the smooth configuration to the configuration 1 in the example of FIG. 4) and so forth by propagation until the last but one segment. The calculation performed on the last segment is different from those performed on the preceding segments. Indeed, for the last segment, the initial air speed, the final air speed (one of the objectives of meeting or preferably of stabilisation) and the initial time are known, being used for usually calculating the final time (t5 on FIG. 4). The time deviation on the last segment can then be defined.

Knowing such time deviation $\Delta t$, it is then possible to perform the calculations defined by the element 29 so as to calculate the final ground distance at t5 and then to use the element 30 to calculate the final altitude at t5 associated with said final ground distance.

The prediction module 14 can calculate the energy being specific to the end of the trajectory by using the following formula (with g the gravitational acceleration):

$$E_{Sf} = \frac{V_{af}^2}{2g} + h_f$$

wherein $V_{af}$ represents the setpoint air speed (meeting objective or, for the preferential case, approach stabilization speed) and $h_f$ represents the final altitude at time t5 calculated by the element 30.

When the prediction module 14 has calculated (on iteration k) the energy state at the end of the trajectory, then the energy deviation between this prediction energy and the setpoint energy is transmitted to the command prediction module. Based on a gradient based processing means (sensitivity of the command with respect to the objective), the correction element 24 for the optimization module 15 calculates a correction term $\Delta t^{(k+1)}$ to be applied to the commands of the iteration k $\{t_{1c}^{(k)}, t_{2c}^{(k)}, t_{1gc}^{(k)}, t_{3c}^{(k)}, t_{4c}^{(k)}\}$ so as to be able to cancel the energy error estimated on iteration k by using the following formula:

$$\Delta t^{(k+1)} = J^{-1} \Delta E^{(k)} \quad \text{(matricial formula)}$$

with:

$$\Delta t^{(k+1)} = \begin{pmatrix} \Delta t_{1c}^{(k+1)} \\ \Delta t_{2c}^{(k+1)} \\ \Delta t_{1gc}^{(k+1)} \\ \Delta t_{3c}^{(k+1)} \\ \Delta t_{4c}^{(k+1)} \end{pmatrix}, \Delta E^{(k)} = \begin{pmatrix} \Delta E_{1c}^{(k)} \\ \Delta E_{2c}^{(k)} \\ \Delta E_{1gc}^{(k)} \\ \Delta E_{3c}^{(k)} \\ \Delta E_{4c}^{(k)} \end{pmatrix} \text{ and }$$

$$J = \begin{pmatrix} \frac{\partial E_{1c}}{\partial t_{1c}} & \frac{\partial E_{1c}}{\partial t_{2c}} & \frac{\partial E_{1c}}{\partial t_{1gc}} & \frac{\partial E_{1c}}{\partial t_{3c}} & \frac{\partial E_{1c}}{\partial t_{4c}} \\ \frac{\partial E_{2c}}{\partial t_{1c}} & \frac{\partial E_{2c}}{\partial t_{2c}} & \frac{\partial E_{2c}}{\partial t_{1gc}} & \frac{\partial E_{2c}}{\partial t_{3c}} & \frac{\partial E_{2c}}{\partial t_{4c}} \\ \frac{\partial E_{1gc}}{\partial t_{1c}} & \frac{\partial E_{1gc}}{\partial t_{2c}} & \frac{\partial E_{1gc}}{\partial t_{1gc}} & \frac{\partial E_{1gc}}{\partial t_{3c}} & \frac{\partial E_{1gc}}{\partial t_{4c}} \\ \frac{\partial E_{3c}}{\partial t_{1c}} & \frac{\partial E_{3c}}{\partial t_{2c}} & \frac{\partial E_{3c}}{\partial t_{1gc}} & \frac{\partial E_{3c}}{\partial t_{3c}} & \frac{\partial E_{3c}}{\partial t_{4c}} \\ \frac{\partial E_{4c}}{\partial t_{1c}} & \frac{\partial E_{4c}}{\partial t_{2c}} & \frac{\partial E_{4c}}{\partial t_{1gc}} & \frac{\partial E_{4c}}{\partial t_{3c}} & \frac{\partial E_{4c}}{\partial t_{4c}} \end{pmatrix}$$

The time deviations $\Delta t$ correspond to the correction terms which will applied to the different commands, the energy deviations $\Delta E$ correspond to the energy error calculated thanks to the prediction module, and J corresponds to the Jacobian matrix that, in other terms, corresponds to the sensitivity matrix of each of the commands on the energy deviations to be minimized. Such matrix is updated on every iteration to increase the processing precision.

So, at the time k+1, the new sequence of commands defined by $t_{ic}^{(k+1)} = t_{ic}^{(k)} + \Delta t^{(k+1)}$ is sent (by the element 25) to the prediction module 14 so as to predict the new energy at the end of the trajectory. The new energy deviation is again sent to the optimization module 15.

So, the energy error is stabilized (converges) and is minimized in a few iterations.

Once the energy error being stabilized and minimized, the command sequence for the slats and flaps and for the landing gear is optimal in the meaning of stabilizing the airplane to the required energy state without using either the engines or the airbrakes.

The invention claimed is:

1. A method for optimized energy management of an aircraft upon a flight along a predetermined trajectory, the method allowing the aircraft to join a given point of the trajectory in a given energy state, with a given position of slats and flaps of the aircraft, and with a given position of landing gear of the aircraft, the method comprising:
   (a) determining a plurality of current parameter values of the aircraft;
   (b) determining a plurality of optimized command orders, which allow the aircraft to reach the given point in the given energy state, by performing the following operations in an iterative way:

(b1) predicting an energy profile corresponding to a set of command orders based on the current parameter values and one or more predetermined models;
(b2) calculating an energy error for the predicted energy profile;
(b3) if the energy error is not stabilized, performing the following operations in an iterative way:
  calculating one or more corrections to be applied to the set of command orders;
  updating the set of command orders based on the corrections; and
  repeating at least steps (b1) and (b2) with the updated set of command orders; and
(b4) if the energy error is stabilized and minimized, using the set of command orders as the optimized command orders in step (c) below; and
(c) applying the optimized command orders to an automatic slats and flaps command device and an automatic landing gear command device for automatic control of the slats and flaps and the landing gear, respectively.

2. The method according to claim 1, wherein at step (a), the current parameter values comprise:
a synchronized time;
an air speed of the aircraft;
a ground distance of the aircraft with respect to a given point;
an altitude of the aircraft;
a position of the slats and flaps;
a position of the landing gear;
a calibrated speed of the aircraft;
an engine thrust level; and
a position of airbrakes of the aircraft.

3. The method according to claim 1, wherein a prediction module predicts the energy profile in step (b1) and an optimization module performs the operations of step (b3).

4. The method according to claim 1, wherein predicting the energy profile further comprises:
making progressive calculations for a plurality of successive segments along the trajectory up to the given point, each segment corresponding to a constant aerodynamic configuration phase with or without the landing gear being in an extended state, a transient aerodynamic configuration phase with or without the landing gear being in an extended state, a constant aerodynamic configuration phase with a transient extension of the landing gear, or a transient aerodynamic configuration phase with a transient extension of the landing gear,
wherein the current parameter values are used as initial parameters for a first segment of the successive segments, and one or more parameters predicted at an end of each segment is used as the initial parameters for a segment directly following.

5. The method according to claim 4, wherein, at step (b), at least one of the following constraints are also taken into account:
a maximal speed being representative of each aerodynamic configuration;
a minimal speed being representative of each aerodynamic configuration; and
a plurality of extension times for the slats and flaps and for the landing gear.

6. The method according to claim 1, wherein the energy error corresponds to a difference between a predicted energy defined by the predicted energy profile and a setpoint energy.

7. The method according to claim 1, wherein the corrections to be applied to the set of command orders cancel the energy error.

8. The method according to claim 1, wherein the predetermined models comprise at least one of:
a wind model, a performance model, an indication of a plurality of dynamics for a plurality of actuators of the aircraft, and an indication of a plurality of operational constraints of the aircraft.

9. The method according to claim 1, wherein, at step (c), information relative to the optimized command orders is presented to a pilot on a viewing screen.

10. The method of claim 1, wherein steps (a), (b), and (c) are performed repeatedly and automatically throughout the flight.

11. The method of claim 1, further comprising:
reaching the given point in the given energy state without use of an engine and airbrakes of the aircraft.

12. An optimized energy management device for an aircraft upon a flight along a predetermined trajectory, the device allowing the aircraft to join a given point of said trajectory in a given energy state, with a given position of slats and flaps of the aircraft, and with a given position of landing gear of the aircraft, said device comprising:
a set of information sources that determine a plurality of current parameter values of the aircraft along said trajectory up to the given point; and
an information processing unit that determines a plurality of optimized command orders, which allow the aircraft to reach said given point in said given energy state, by performing the following operations in an iterative way:
  (a1) predicting an energy profile corresponding to a set of command orders based on the current parameter values and at least one predetermined model;
  (a2) calculating an energy error for the predicted energy profile;
  (a3) if the energy error is not stabilized:
    calculating one or more corrections to be applied to the set of command orders;
    updating the set of command orders based on the corrections; and
    repeating at least steps (a1) and (a2) with the updated set of command orders; and
  (a4) if the energy error is stabilized and minimized, using the set of command orders as the optimized command orders; and
an automatic slats and flaps command device and an automatic landing gear command device that apply the optimized command orders for automatic control of the slats and flaps and the landing gear, respectively.

13. The device according to claim 12, further comprising:
a viewing screen that displays information relative to the optimized command orders.

14. The device according to claim 12, further comprising:
an interface to allow an operator to enter data into said device.

15. A system for optimizing the energy of an aircraft upon a flight along a predetermined trajectory so as to join a given point of the trajectory in a given energy state, with a given position of slats and flaps of the aircraft, and with a given position of landing gear of the aircraft, the system comprising:
an optimized energy management device located on the aircraft, the optimized energy management device comprising:
  a set of information sources that determine a plurality of current value parameters of the aircraft along said trajectory up to the given point; and
  an information processing unit that determines a plurality of optimized command orders, which allowing the aircraft to reach said given point in said given energy state, by performing the following operations in an iterative way:
(a1) predicting an energy profile corresponding to a set of command orders based on the current parameter values and at least one predetermined model;
(a2) calculating an energy error for the predicted energy profile;
(a3) if the energy error is not stabilized:
calculating one or more corrections to be applied to the set of command orders;
updating the set of command orders based on the corrections; and
repeating at least steps (a1) and (a2) with the updated set of command orders; and
(a4) if the energy error is stabilized and minimized, using the set of command orders as the optimized command orders; and
an automatic slats and flaps command device and an automatic landing gear command device that apply the optimized command orders for automatic control of the slats and flaps and the landing gear, respectively.

* * * * *